(12) United States Patent
Morais et al.

(10) Patent No.: US 12,730,891 B1
(45) Date of Patent: Sep. 8, 2026

(54) HYBRID SCANNING USING DEFERRAL LEARNING

(71) Applicant: Amazon Technologies, Inc., Seattle, WA (US)

(72) Inventors: Michael James Morais, New York, NY (US); Marion Marschalek, Portand, OR (US); Wei Ding, Vancouver (CA); Jeffrey Earl Bickford, Thornton, CO (US); Baris Coskun, Glen Rock, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 18/066,885

(22) Filed: Dec. 15, 2022

(51) Int. Cl.
*G06F 21/56* (2013.01)
*G06N 20/20* (2019.01)

(52) U.S. Cl.
CPC .......... *G06F 21/566* (2013.01); *G06N 20/20* (2019.01); *G06F 2221/034* (2013.01)

(58) Field of Classification Search
CPC .. G06F 21/566; G06F 2221/034; G06N 20/20
See application file for complete search history.

(56) References Cited

U.S. PATENT DOCUMENTS 7,849,507 B1 * 12/2010 Bloch .................. H04L 63/168 726/22
8,832,832 B1 9/2014 Visbal
9,231,965 B1 1/2016 Vasseur
9,363,282 B1 6/2016 Yu
9,756,070 B1 * 9/2017 Crowell .................. G06F 21/56
10,320,813 B1 6/2019 Ahmed et al.
10,826,933 B1 11/2020 Ismael
11,727,113 B1 * 8/2023 Briliauskas ........... G06F 21/565 713/188
12,118,095 B1 * 10/2024 Millar .................... G06N 20/00
2003/0051026 A1 3/2003 Carter et al.
2004/0015719 A1 1/2004 Lee et al.
2005/0144480 A1 6/2005 Kim et al.
2007/0074272 A1 3/2007 Watanabe
(Continued)

OTHER PUBLICATIONS

Fire Eye Inc., "The Business Case for Protecting Against Advanced Attacks", https://www2.fireeye.com/StopTheNoise-IDC-Numbers-Game-Special-Report.html., dated 2014, pp. 1-13.
(Continued)

*Primary Examiner* — Carl G Colin
*Assistant Examiner* — Zhe Liu
(74) *Attorney, Agent, or Firm* — Alexander A. Knapp; Kowert, Hood, Munyon, Rankin & Goetzel, P.C.

(57) ABSTRACT

Systems and methods for performing malware scanning for a service provider network are disclosed. In response to accessing one or more files, file attributes may be determined. Confidence values may be generated based on the file attributes and may be used to select a scan operation. Such scan operations may include a scan operation using a 3rd party malware scan algorithm or a scan operation using a machine learning generated model. The selection of the scan operation may be performed based on a deferral learning model.

20 Claims, 8 Drawing Sheets

(56) References Cited

U.S. PATENT DOCUMENTS

| | | | | |
|---|---|---|---|---|
| 2007/0094491 | A1 | 4/2007 | Teo et al. | |
| 2008/0033672 | A1 | 2/2008 | Gulati | |
| 2008/0098476 | A1 | 4/2008 | Syversen | |
| 2009/0265778 | A1 | 10/2009 | Wahl | |
| 2010/0007489 | A1 | 1/2010 | Misra et al. | |
| 2011/0023114 | A1 | 1/2011 | Diab | |
| 2011/0060956 | A1 | 3/2011 | Goldsmith | |
| 2011/0214157 | A1 | 9/2011 | Korsunsky | |
| 2011/0225644 | A1 | 9/2011 | Pullikottil et al. | |
| 2012/0084859 | A1* | 4/2012 | Radinsky | G06F 21/56 707/E17.046 |
| 2012/0110667 | A1* | 5/2012 | Zubrilin | G06F 21/56 726/24 |
| 2012/0284793 | A1 | 11/2012 | Steinbrecher | |
| 2014/0059683 | A1 | 2/2014 | Ashley | |
| 2014/0223555 | A1 | 8/2014 | Sanz Hernando et al. | |
| 2014/0289856 | A1 | 9/2014 | Jiang et al. | |
| 2014/0380466 | A1 | 12/2014 | Schultz | |
| 2015/0033341 | A1 | 1/2015 | Schmidtier | |
| 2015/0067857 | A1 | 3/2015 | Symons | |
| 2015/0304343 | A1 | 10/2015 | Cabrera | |
| 2015/0355957 | A1 | 12/2015 | Steiner | |
| 2016/0028753 | A1 | 1/2016 | Di Pietro | |
| 2016/0028754 | A1 | 1/2016 | Crus | |
| 2016/0078362 | A1 | 3/2016 | Christodorescu | |
| 2016/0087861 | A1 | 3/2016 | Kuan | |
| 2016/0099963 | A1 | 4/2016 | Mahaffey | |
| 2016/0164886 | A1 | 6/2016 | Thrash | |
| 2016/0191545 | A1 | 6/2016 | Nanda | |
| 2016/0212012 | A1 | 7/2016 | Young | |
| 2017/0063891 | A1 | 3/2017 | Muddu | |
| 2017/0070528 | A1 | 3/2017 | Coskun | |
| 2017/0134397 | A1* | 5/2017 | Dennison | G06F 16/9535 |
| 2017/0262633 | A1* | 9/2017 | Miserendino | G06N 5/025 |
| 2017/0300693 | A1* | 10/2017 | Zhang | G06F 21/566 |
| 2018/0026995 | A1* | 1/2018 | Dufour | H04W 12/128 726/23 |
| 2018/0027006 | A1 | 1/2018 | Zimmermann | |
| 2018/0082064 | A1* | 3/2018 | Wang | G06F 21/563 |
| 2018/0103056 | A1 | 4/2018 | Kohout | |
| 2019/0132787 | A1* | 5/2019 | Ryan | H04W 12/12 |
| 2019/0138938 | A1 | 5/2019 | Vasseur | |
| 2019/0297096 | A1 | 9/2019 | Ahmed et al. | |
| 2020/0380160 | A1* | 12/2020 | Kraus | G06F 21/577 |
| 2021/0281592 | A1* | 9/2021 | Givental | G06N 20/10 |
| 2022/0036208 | A1* | 2/2022 | Rao | H04L 63/145 |
| 2022/0230070 | A1* | 7/2022 | Shabtai | G06F 18/217 |
| 2022/0414214 | A1* | 12/2022 | Strogov | G06F 21/563 |
| 2023/0214485 | A1* | 7/2023 | Beek | G06F 21/56 726/24 |
| 2023/0229782 | A1* | 7/2023 | Mohanty | G06F 21/577 726/23 |

OTHER PUBLICATIONS

S. Mathew, D. Britt, R. Giomundo, S. Upadhyaya, M. Sudit, and A. Stotz. Realtime multistage attack awareness through enhanced intrusion alert clustering. In MILCOM 2005—2005 IEEE Military Communications Conference, vol. 3, pp. 1801-1806, Oct. 2005.

S. Mathew, C. Shah, and S. Upadhyaya. An alert fusion framework for situation awareness of coordinated multistage attacks. In Third IEEE International Workshop on Information Assurance (IWIA'05), pp. 95-104, Mar. 2005.

Wajih Ul Hassan, Shengjian Guo, Ding Li, Zhengzhang Chen, Kangkook Jee, Zhichun Li, and Adam Bates. Nodoze: Combatting threat alert fatigue with automated provenance triage. In NDSS, 2019.

Steven Noel, Eric Harley, Kam Him Tam, and Greg Gyor. Big-data architecture for cyber attack graphs representing security relationships in nosql graph databases. 2014.

S. Noel, P. D. Rowe, S. Purdy, M. Limiero, T. Lu, and W. Mathews. Missionfocused cyber situational understanding via graph analytics. In 2018 10th International Conference on Cyber Conflict (CyCon), pp. 427-448, 2018.

Wikipedia contributors. Sqrrl—Wikipedia, the free encyclopedia. https://en.wikipedia.org/w/index.php?title=Sqrrl&oldid=899580655, 2022.

Wikipedia contributors. Birthday problem—Wikipedia, the free encyclopedia. https://en.wikipedia.org/w/index.php?title=Birthday_problem&oldid=912594355, 2022.

Matei Zaharia, Reynold S. Xin, PatrickWendell, Tathagata Das, Michael Armbrust, Ankur Dave, Xiangrui Meng, Josh Rosen, Shivaram Venkataraman, Michael J. Franklin, Ali Ghodsi, Joseph Gonzalez, Scott Shenker, and Ion Stoica. Apache spark: A unified engine for big data processing. Commun. ACM, 59(11):56-65, Oct. 2016.

Joseph E. Gonzalez, Reynold S. Xin, Ankur Dave, Daniel Crankshaw, Michael J. Franklin, and Ion Stoica. Graphx: Graph processing in a distributed dataflow framework. In Proceedings of the 11th USENIX Conference on Operating Systems Design and Implementation, OSDI'14, pp. 599-613, Berkeley, CA, USA, 2014. USENIX Association.

Quissem Ben Fredj. A realistic graph-based alert correlation system. Security and Communication Networks, 8 (15):2477-2493, 2015.

U.S. Appl. No. 17/809,519, filed Jun. 28, 2022, McCubbin, et al.

U.S. Appl. No. 18/065,481, filed Dec. 13, 2022, Zhang et al.

AWS, "Amazon GuardDuty," downloaded from https://aws.amazon.com/guardduty/ on Dec. 20, 2022, pp. 1-8.

AWS, "AWS CloudTrail," downloaded from https://aws.amazon.com/cloudtrail/ on Dec. 20, 2022, pp. 1-7.

Ashish Vaswani, Noam Shazeer, Niki Parmar, Jakob Uszkoreit, Llion Jones, Aidan N Gomez, Łukasz Kaiser, and Illia Polosukhin. "Attention is all you need." In Advances in neural information processing systems, pp. 5998-6008, 2017.

Jacob Devlin, Ming-Wei Chang, Kenton Lee, and Kristina Toutanova. "Bert: Pre-training of deep bidirectional transformers for language understanding," arXiv preprint arXiv:1810.04805, Version 2 2019, pp. 1-16.

Min Du, Feifei Li, Guineng Zheng, and Vivek Srikumar. "Deeplog: Anomaly detection and diagnosis from system logs through deep learning." In Proceedings of the 2017 ACM SIGSAC Conference on Computer and Communications Security, pp. 1285-1298, 2017.

Ian Goodfellow, Yoshua Bengio, and Aaron Courville. "Deep learning". MIT press, Oct. 3, 2015, pp. 1-705.

Min-hwan Oh and Garud Iyengar. "Sequential anomaly detection using inverse reinforcement learning." In Proceedings of the 25th ACM SIGKDD International Conference on Knowledge Discovery & Data Mining, pp. 1480-1490, 2019.

Noveen Sachdeva, Giuseppe Manco, Ettore Ritacco, and Vikram Pudi. "Sequential variational autoencoders for collaborative filtering". In Proceedings of the Twelfth ACM International Conference on Web Search and Data Mining, pp. 600-608, 2019.

* cited by examiner

FIG. 4

HYBRID SCANNING USING DEFERRAL LEARNING

BACKGROUND

Many enterprises employ security detection tools that generate security alerts or findings on their computer networks. These security detection tools fall into categories such as Intrusion Detection System (IDS), Security Information and Event Management (SIEM), User and Entity Behavior Analytics (EUBA), Cloud Access Security Broker (CASB), Next Generation Firewall (NGFW), Web Application Firewall (WAF), and other types of systems. Such tools may utilize an antivirus scanner to scrutinize files for malware. Most antivirus scanners are not effective for every type of observable sample. Such scanners have shortcomings due to limited detection of malware depending on the type of system or files resulting in false negatives and false positives. Multiple scanners may be used but contradicting verdicts produces unclear results for the user.

BRIEF DESCRIPTION OF THE DRAWINGS

FIG. 4 is a block diagram illustrating example components of a file that may be scanned by a malware scanner module, according to some embodiments.

Figure 1:
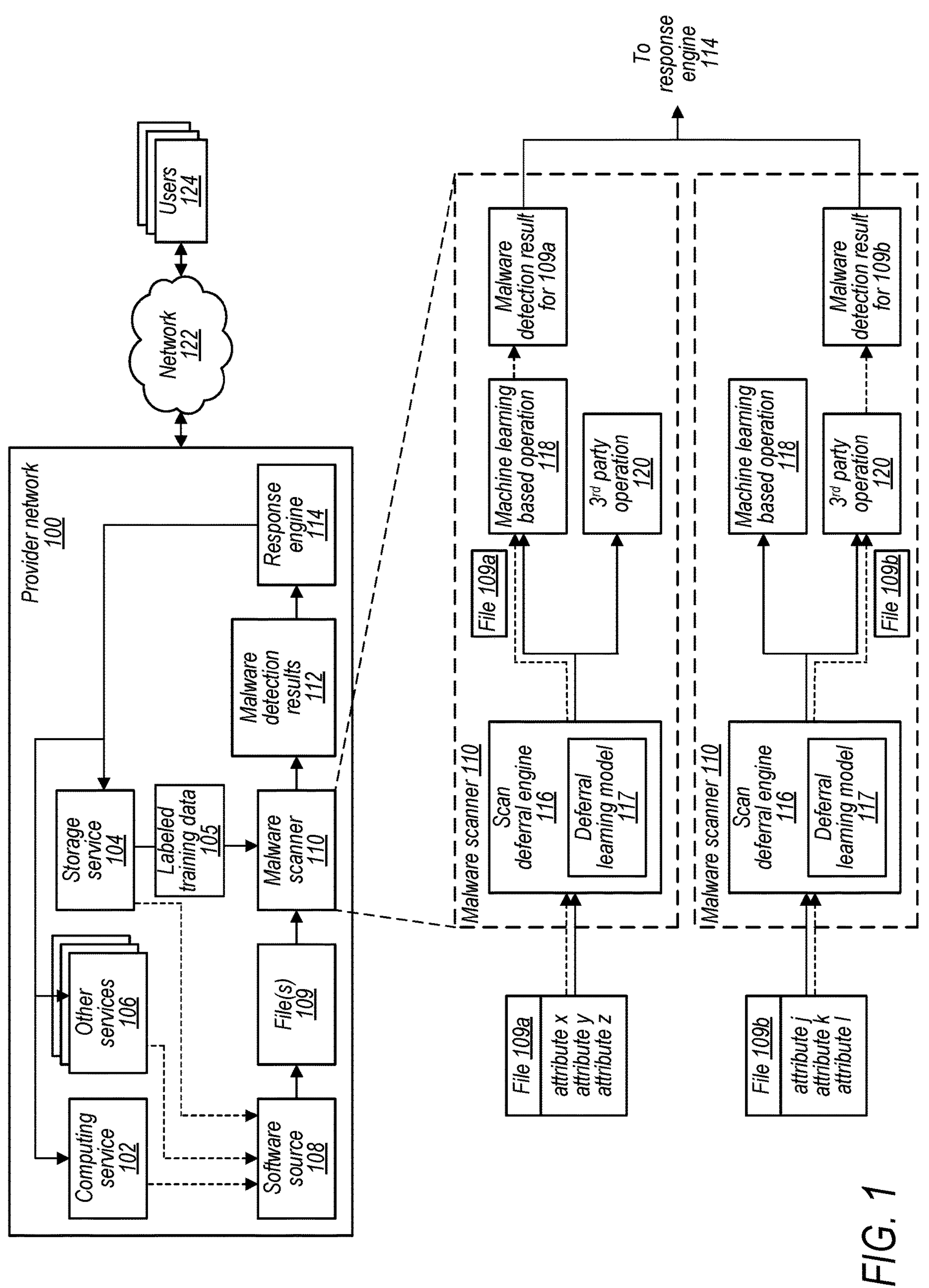
FIG. 1 is a block diagram illustrating a service provider network, wherein a software source of the service provider network provides files from a service to a malware scanner module that determines malware detection results based on the files, wherein the malware detection results are determined by a deferral learning model that selects a scan operation to scan the files, according to some embodiments.

While embodiments are described herein by way of example for several embodiments and illustrative drawings, those skilled in the art will recognize that embodiments are not limited to the embodiments or drawings described. The drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components.

"Configured To." Various units, circuits, or other components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on). The units/components used with the "configured to" language include hardware—for example, circuits, memory storing program instructions executable to implement the operation, etc. Reciting that a unit/component is "configured to" perform one or more tasks is expressly intended not to invoke 35 U.S.C. § 112, paragraph (f), for that unit/component. Additionally, "configured to" can include generic structure that is manipulated by software or firmware to operate in manner that is capable of performing the task(s) at issue.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

It will also be understood that, although the terms 1, 2, N, etc. may be used herein to describe various elements, these elements should not be limited by these terms. These terms are only used to distinguish one element from another. For example, a component with the term 1 could be termed a second component, and, similarly, a component with the term 2 could be termed a first component, without departing from the scope of the present invention. The first components and the second component are both components, but they are not the same components. Also, the term N indicates that an Nth amount of the elements may or may not exist depending on the embodiments.

DETAILED DESCRIPTION OF EMBODIMENTS

Malware such as viruses, ransomware, cryptominers, worms, viruses, trojans, bot[net]s, adware, spyware, and rootkits are significant problems in cybersecurity. Although many sophisticated security detection tools for scanning malware exist, such as engineered antivirus scanners, such detection tools may not be effective for all observable samples, such as new (so-called "day-one") malware or repurposed variants of existing malware. For example, some malware types may not be effectively detected by classical engineered antivirus scanners, as may be provided by $3^{rd}$ party anti-virus software vendors. Alternatively, machine-learning based models have been used for malware detection as a new option but have not provided as comprehensive of a solution as engineered anti-virus scanners. For example, machine-learning based models may yield highly effective results for some malware included in training data, but not other malware not included in the training data. Also, machine-learning models may be trained on files of a particular type and may exhibit diminished performance when scanning files of other types. Conversely, though, machine learning-based models may exhibit superior performance as compared to engineered scanners for new (so-called "day-one") malware or repurposed variants of existing malware that have not yet been accounted for in a most recent software update of such engineered scanners. While an engineered antivirus scanner and a machine-learning based model scanner may be used together, the results in such a combined approach may be conflicting (e.g., each scanner may come to a different conclusion regarding whether a given file is malicious or not) thus leaving the user with the responsibility of deciding which of the conflicting results is an accurate verdict. Thus, combining the two solutions to create a hybrid malware scanner that further employs deferral learning to output only one authoritative verdict may improve accuracy by reducing false positives, reducing false negatives, increasing detection rates, and otherwise improving the user experience.

To address these issues and/or other issues, this application describes a system that implements malware scanning, wherein a unified (e.g. singular) scan operation verdict is determined from a malware scan system that uses both a first and a second scanner, such as a machine learning model-based scanner and an engineered scanner (e.g., such as a commercial $3^{rd}$ party scanner), wherein the selection of which scanner/scanner result to use to determine the unified scan operation verdict is based on a deferral model. In some embodiments, the malware scan system may implement both a machine learning-based scan operation and a scan operation using a third-party scan algorithm for detecting malware. Also, the malware scan system may implement a second machine learning model that may be trained and used to make deferral decisions, e.g., whether to defer to the third-party scan algorithm or to defer to the machine learning-based scan operation. Because only one option/scan result is selected by the deferral model, conflicting results are avoided. In some embodiments, the deferral model may be trained to identify files with attributes that have a high propensity of accurate verdicts using a first one of the scan operations and also to identify files with other attributes that have a high propensity of accurate verdicts when scanned by the other one of the scan operations. The malware detection results may indicate whether or not there is malware in the scanned one or more files to at least a threshold level of confidence.

In some embodiments, one or more files to be scanned for malware may be accessed and file attributes associated with the one or more files may be determined. Examples of file attributes may include but are not limited to, a class field, a version value, a machine type, a file type, a data size, or a data type. In some embodiments, the one or more files may be based on operating systems including but not limited to, Linux, Windows, macOS, Android, or iOS. In some embodiments, the deferral model may be trained using files of various types and may assign different confidence values for different ones of the scanner options to files having different respective sets of one or more attributes. As an example, a file with attributes ABC may be assigned a greater confidence for scans performed by the engineered scanner, whereas another file with attributes XYZ may be assigned a greater confidence for scans performed by the machine learning-based scanner. Thus, when encountering files having attributes ABC, the deferral model may defer to the engineered scan, and when encountering files having attributes XYZ, the deferral model may defer to the machine learning-based scanner. In some embodiments, the relationships between file attributes and confidence values for the respective scanner options may be generated using a machine-learning model trained on annotated training data, wherein the training data is scanned by both scanner options and the annotations in the training data is used to determine which of the respective scanner options provides more correct results (as compared to the other scan option) for files having a given set of one or more attributes.

As mentioned above, in some embodiments, the malware scanner may determine which scan operation to use to scan the one or more files based on confidence values associated with the one or more file attributes using a deferral learning model. In some embodiments, a confidence value may include a decimal value indicating the confidence the deferral learning model has in a scan operation. For example, a confidence value of 0.9 for the machine learning based scan operation and a confidence value of 0.8 for the third-party scan operation may indicate that the machine learning based scan operation may be selected to scan the files because the confidence value is higher than the third-party scan operation. In some embodiments, any measurement system or range of values may be used for confidence values. For example, in some embodiments, confidence values may alternatively range from 0 to 100 or may use binary or other values instead of integer or decimal numbers. In some embodiments, a threshold for the confidence values may be used to indicate whether the scan operations are able to detect malware confidently.

In such embodiments, the deferral learning model may be trained using labeled training data. The labeled training data may include files with known malware verdicts. Such malware verdicts may be audited by multiple malware scanners (e.g., the scan options for which the deferral learning model is being trained to select between). The training of the machine learning-based scan operation may be trained to detect malware using the same labeled training data. Thus, it is not necessary to maintain different sets of training data for training each of the machine learning-based scanner and the deferral learning model. Though in some embodiments, separate training data sets may be used. The confidence values may be generated based on whether predicted malware detection results of the scan operations match malware detection results of files with similar attributes indicated in labels in the training data. In some embodiments, the confidence values may also be generated based on user selection preferences towards false positives or false negatives. In some embodiments the determination of the scan operation may by default be biased towards the third-party scan algorithm.

The chosen scan operation may scan the files and produce malware detection results. Such results may be provided to a response generator to provide a response action to a user, based at least in part, on the malware detection results. The response action may include, but is not limited to, a malware detection notification to the user, removal of the file containing the malware, or a source of the malware being blocked. In some embodiments, the system may scan for types of malware, including ransomware, viruses, cryptominers, worms, viruses, trojans, bot[net]s, adware, spyware, and rootkits, as described herein.

As will be appreciated by those skilled in the art, features of the system disclosed herein may be implemented in computer systems to solve technical problems in the state of the art and to improve the functioning of the computer systems. These and other features and advantages of the disclosed system are discussed in further detail below, in connection with the figures.

FIG. 1 is a block diagram illustrating a service provider network, wherein a software source of the service provider network provides files from a service to a malware scanner module that determines malware detection results based on the files, wherein the malware detection results are determined by a deferral learning model that selects a scan operation to scan the files, according to some embodiments.

Figure 4:
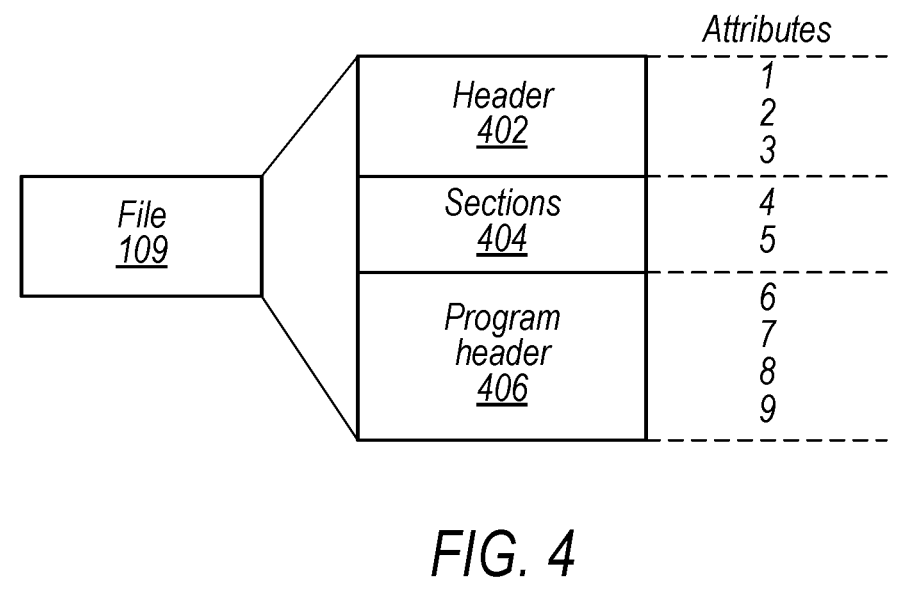

In some embodiments, scanning one or more files for malware, such as by malware scanner 110 of service provider network 100, may resemble embodiments as shown in FIG. 1. In some embodiments, services such as computing service 102, storage service 104, and other services 106 may provide one or more files 109 to a software source for scanning 108. The malware scanner 110 may access the one or more files 109 from the software source for scanning 108. The one or more files 109 may include attributes used with or in relation to the respective services or files. For example, attributes may be included in header information or other metadata associated with the files. For example, FIG. 4 illustrates an example file that includes attributes in a header for the file, in section labels, and in a program header for one or more programs included in the file. In such embodiments, to perform the malware scanning for the one or more files 109, the malware scanner 110 may output malware detection results 112 based on one or more of the one or more files 109 to a response engine 114. In some embodiments, the one or more files 109 may be divided into groups based on the operating system of each file and each group of the one or more files 109 may be provided to a malware scanner that is trained for files of the operating system of the group. Such operating systems may include but are not limited to Linux, Windows, macOS, Android, or iOS.

The response engine 114 may then provide information to the computing service 102, the storage service 104, or the other services 106 in response to the malware detection results 112. The malware scanner 110 may be trained based on labeled training data 105, sent from the storage service 104. The labeled training data 105 may include one or more files with labels indicating whether a file contains malware. An example of malware may be a virus that injects malicious code into files that may run when the files open. The labeled training data 105 may include data with labels audited by multiple scanners. In some embodiments, a network 122 may receive and provide information to the provider network 100. The network 122 may also receive and provide information to users 124. For example, users 124 may submit files and/or interact with services 102, 104, and 106 via network 122. Also, in some embodiments, services 102, 104, and 106 may interact with one another. For example, computing service 102 may retrieve an application file from storage service 104, or other services 106.

In some embodiments, to perform the malware scanning, a file **109*a* including attributes x, y, and z may be inputted into a scan deferral engine 116. The scan deferral engine 116 may determine the operation that will scan the file 109*a* by using a deferral learning model 117. In some embodiments, the scan deferral engine 116 may send the file 109*a* to a machine learning-based operation 118. The machine learning-based operation may scan the file 109*a* for malware and then output the malware detection result for the file 109*a*. In some embodiments, the scan deferral engine 116 may select the $3^{rd}$ party operation 120 to scan file 109*b*. The $3^{rd}$ party operation 120 may then output the malware detection result after scanning the file 109*b*. The paths shown through the file 109*a* and the file 109*b* show examples of possible pathways the scan deferral engine 116 select depending on the attributes of the files. The attributes listed for both the file 109*a* and the file 109*b* represent possible attributes that may be included in the files and the files 109** may include more than three attributes.

For example, for file **109*a* having attributes x, y, and z, the deferral learning model 117 may have been trained using files with attributes x, y, or z or similar attributes that correspond to attributes x, y, and z. Furthermore, the deferral learning model 117 may have learned confidence values for the machine learning based scan and the $3^{rd}$ party scan operation for the files in the training data having attributes x, y, and/or z. For example, the deferral learning model may have been trained that a file with attributes x, y, and/or z when scanned using $3^{rd}$ party scan operation are correctly classified as having malware with a 90% confidence for positive determinations (includes malware) and a 10% confidence for negative determinations (e.g., no malware). In some embodiments, the confidence may alternatively be expressed as a probability of a false positive or a false negative. In a similar manner, the deferral learning model may have been trained using the training data, such that the deferral learning model also includes confidence values for files with attributes x, y, and/or z when scanned using the machine learning based scan operation. As an example, the machine learning based scan operation may yield an 3% confidence for positive determinations and a 97% confidence for negative determinations. The scan deferral engine may then select which of the scan operations to use to scan a given file with attributes x, y, and z based on the relative confidence values for each respective scan operation. In some situations, false positives may be preferable to false negatives, or vice-versa. In some embodiments, a customer of the provider network 100 may provide information indicating a preference for erring on the side of false positives or false negatives. A similar process may have been performed to train the deferral learning model 117 for files with attributes j, k, and/or 1, such as for file 109*b***. In some embodiments, any of various attributes may be used to classify files and associated confidence values may be learned by the deferral learning model for files with the various attributes or combinations of attributes.

In some embodiments, if malware is detected, a notification may be provided to a service that provided the file to software source for scanning 108, in order to notify the service that a file received from the service includes malware. Also, if malware is detected, a user 124 may be notified. For example, the user may be a customer of the service and/or may otherwise be associated with the service or file, and therefore may need to be notified about the malware. In some embodiments, when malware is detected, such a detection determination may be reviewed by the provider network 100 to verify the detection result and/or to determine a recipient list for notifications based on a type of file in which the malware was found, a type of malware detected, and/or other factors.

Figure 2:
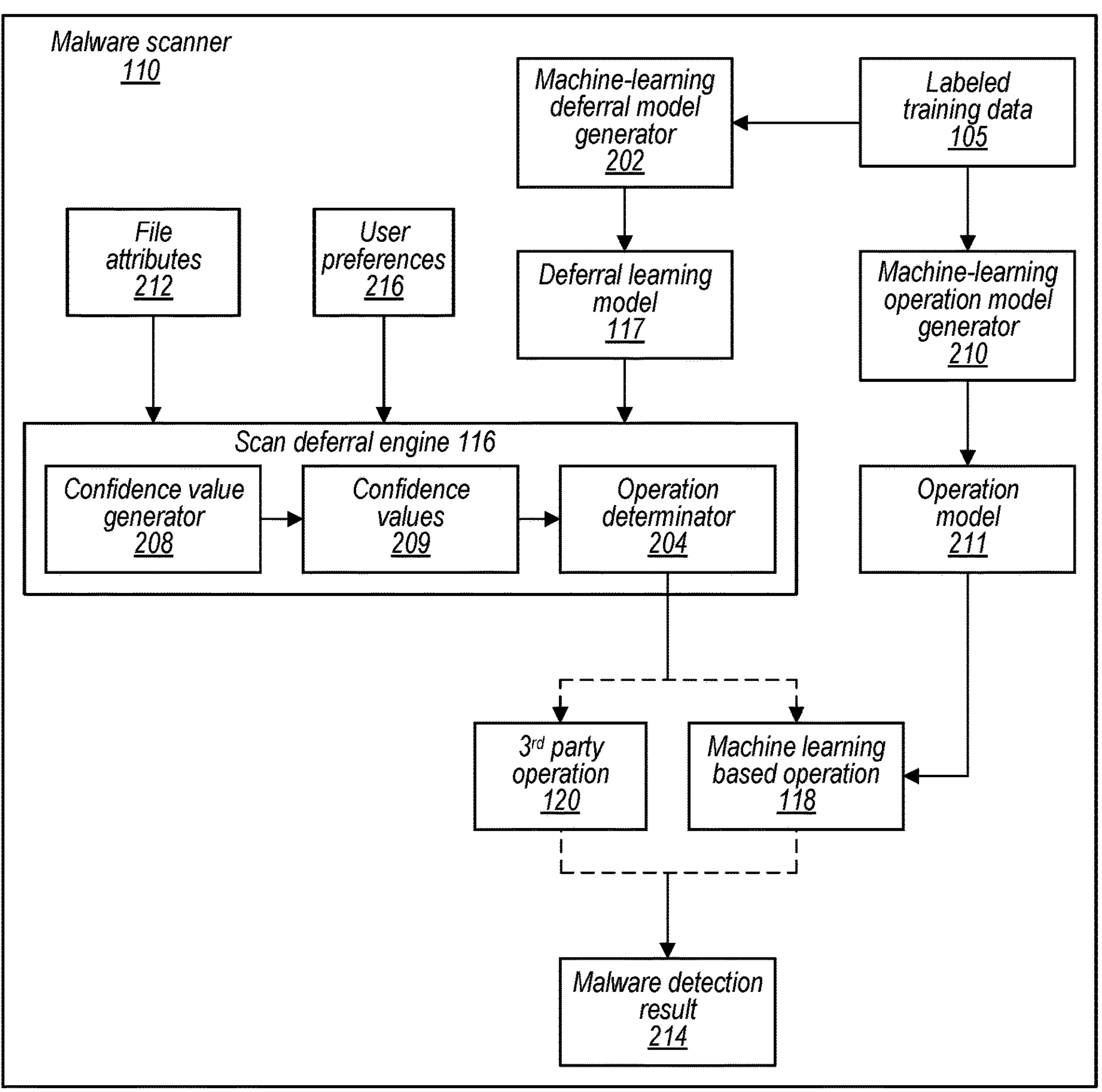
FIG. 2 is a block diagram illustrating a malware scanner module, wherein a scan deferral engine determines an operation to scan files and outputs a malware detection result based on confidence values using file attributes, user preferences, and a deferral learning model, according to some embodiments.

FIG. 2 is a block diagram illustrating a malware scanner module, wherein a scan deferral engine determines an operation to scan files and outputs a malware detection result based on confidence values using file attributes, user preferences, and a deferral learning model, according to some embodiments.

Some embodiments, such as shown in FIG. 1, may include further features such as shown in FIG. 2. For example, in some embodiments, malware scanning, such as those described herein, may be performed using a malware scanner 110 such as in FIG. 2. In such embodiments, file attributes 212 and user preferences 216 may be provided to a scan deferral engine 116. In some embodiments, the file attributes 212 may be attributes of the one or more files 109 in FIG. 1. The user preferences 216 may include information about indicating user preferences to adjust the confidence values towards false positives or false negatives. The scan deferral engine 116 may be trained to perform the selection of scan operations to scan one or more files for malware.

In some embodiments, to train the scan deferral engine 116, labeled training data 105 may be provided to a machine-learning deferral model generator 202, wherein the machine-learning deferral model generator 202, using the labeled training data 105, outputs and provides a deferral learning model 117 to the scan deferral engine 116. The labeled training data 105, may include files with and without malware that are labeled indicating whether each file contains malware. In some embodiments, the labeled training data 105 may also be provided to a machine-learning operation model generator 210 that in response outputs an operation model 211 to a machine learning based operation 118, using the labeled training data 105. The machine learning-based operation 118 may scan for malware using the operation model 211. Thus in some embodiments, a common set of training data may be used to train the deferral learning model and to also train the machine-learning model used by the machine learning based scan operation.

In some embodiments, the scan deferral engine 116 and the machine learning based operation 118 may act as one monolithic component, rather than two separate components. In such embodiments, the monolithic component may receive both the deferral learning model 117 and the operation model 211 from the machine-learning deferral model generator 202 and the machine learning operation model generator 210 respectively. In some embodiments, the monolithic component may receive information for both models in a single model that has been generated by a single generator. For example, the monolithic component may select the operation and if the selected operation is the machine learning based operation 118, then the monolithic component may also scan the one or more files 109 and determine the malware detection result 214. If the selected operation is the 3$^{rd}$ party operation 120, then the 3$^{rd}$ party operation 120 may scan the one or more files 109 and determine the malware detection result 214, as described above with regard to FIG. 1.

The scan deferral engine 116 may perform the selection of scan operations. In some embodiments of the scan deferral engine 116, a confidence value generator 208 provides confidence values 209 to an operation determinator 204 that may then select the scan operation based on the confidence values. The confidence values 209 may include values between 0 and 1 for each scan operation (or other suitable range of values). The confidence value generator 208 may generate the confidence values 209 based on the file attributes 212 and the user preferences 216 provided to the scan deferral engine 116. In some embodiments, a threshold for the confidence values 209 may be used to indicate whether either scan operations are able to detect malware confidently. For example, if the confidence values 209 for the scan operations are lower than the threshold, the file for these confidence values 209 may be sent to a service for further analysis. In such an example, the service may include an engineer that examines the file for malware. Said another way, for some limited number of attribute combinations, files with such attribute combinations may correspond to confidence values for either scan operation that are below the threshold value, in which case the files may be sent to a 3$^{rd}$ destination, such as an engineer, for further review. In another example, if the confidence values 209 are higher than the threshold, then the scan operations are deemed fit to confidently scan the file and the confidence values may continue to be provided to the operation determinator 204. In some embodiments, if both scan operations have confidence values higher than the threshold, a given one of the scan operations may be selected based on a user preference, system default preference, or by selecting the scan operation with the overall highest confidence.

In some embodiments, the deferral learning model 117 may train the confidence generator 208 to recognize one or more files with similar attributes from the labeled training data 105 and generate values representing the confidence that the scan operations will output a malware detection result that matches the labels of the one or more files with the similar attributes in the labeled training data 105. For example, a confidence values may be closer to 1 (as an example) when the predicted malware detection result for the file matches the malware detection result of the deferral learning model 117 for a file with similar file attributes.

The operation determinator 204, when executed, may determine a scan operation to scan the one or more files 109 of FIG. 1. In some embodiments, a scan operation may be determined for each file of the one or more files 109. Both a 3$^{rd}$ party operation 120 and the machine learning-based operation 118 may be options the scan deferral engine 116 may choose from to scan the one or more files 109. In result of the operation determinator 204 determining the scan operation, the determined scan operation may scan for malware and output a malware detection result 214. The malware detection result 214 may indicate malware. For example, the malware detection result 214 may state "MALICIOUS" for malware and "BENIGN" for no malware. Also, various other labeling schemes may be used.

It should be noted that the operation determinator and the malware detection result generate a single unified result that can then be used to determine a classification of the file as including or not including malware. For example, if a 3$^{rd}$ party scan and a machine learning based scan were run in parallel without the use of a scan deferral engine 116, there would be a possibility of conflicting results. For example, in such a situation it would be possible for the 3$^{rd}$ party scan to return a result of "no malware" while the machine learning based scan returned a result of "malware detected." In such a situation the conflicting results would not be actionable because there would be ambiguity as to which result is correct/should be believed. In contrast, the scan deferral engine 116 selects either the 3$^{rd}$ party scan or the machine learning based scan, based on file type attributes and confidences, such that a single unified result is returned. The single result can then be acted upon without the ambiguity concerns associate with parallel scanning without a deferral engine.

Figure 3:
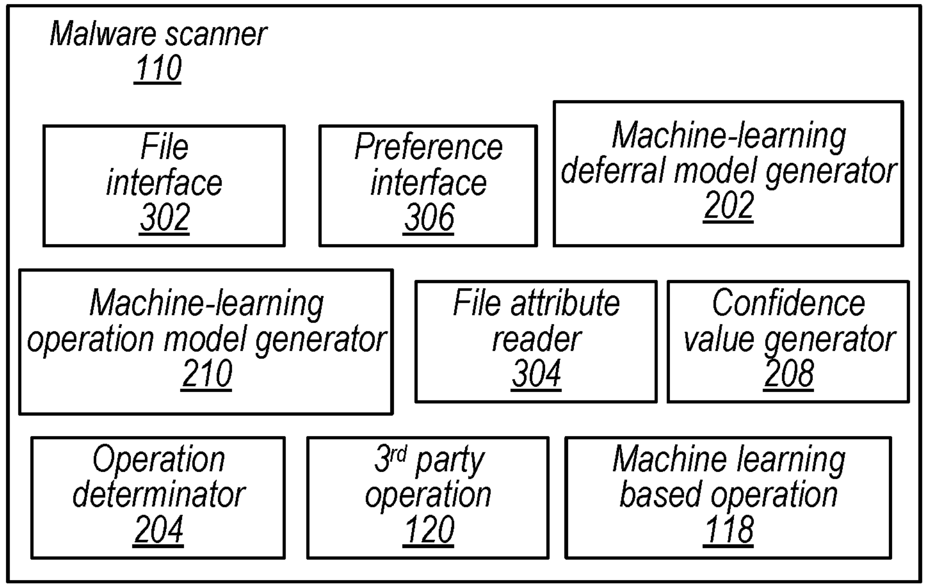
FIG. 3 is a block diagram illustrating example components of a malware scanner module that may be used to perform malware scanning, according to some embodiments.

FIG. 3 is a block diagram illustrating example components of a malware scanner module that may be used to perform malware scanning, according to some embodiments.

Some embodiments, such as shown in FIGS. 1 and 2, may include further features such as shown in FIG. 3. For example, in some embodiments, malware scanning, such as those described herein, may be performed using a malware scanner that may use components, such as in FIG. 3. In such embodiments, the malware scanner 110 may include further components such as, file interface 302, preference interface 306, machine-learning deferral model generator 202, machine-learning operation model generator 210, file attribute reader 304, confidence value generator 208, operation determinator 204, 3<sup>rd</sup> party operation 120, and machine learning-based operation 118. A person having ordinary skill in the art should understand that while several components are shown in FIG. 3 for the malware scanner 110, in some embodiments the malware scanner 110 may include other components not listed.

In some embodiments, one or more files 109 may be received or accessed by the file interface 302, when executed. In such embodiments, the one or more files 109 may be provided to or accessed by the malware scanner from the software source 108 to scan the one or more files 109 for malware as shown in FIG. 1. Users may provide user preferences about the scan operations to the preference interface 306. Such user preferences may include but are not limited to, preferences between scan operations or preferences between false positives or false negatives. For example, a user that has more trust in the third-party operation 120 than the machine learning based operation 118 may input a bias towards the third-party operation 120 into the preference interface 306. In another example, a user that does not want to miss detecting a single piece of malware may increase their preference towards false positives rather than false negatives. In some embodiments, the preference interface 306 may provide the preferences to the scan deferral engine 116 as shown in FIG. 2.

When executed, the machine-learning deferral model generator 202 may cause the malware scanner 110 to generate a trained model for use by the scan deferral engine 116 as shown in FIG. 2. In some embodiments, training may occur by inputting labeled training data 105 into the machine-learning deferral model generator 202. The machine-learning deferral model generator 202 then may generate and provide a deferral learning model 117 to the scan deferral engine 116 that has been trained on the labeled training data 105, as shown in FIG. 2.

When executed, the machine-learning operation model generator 210 may cause the malware scanner to generate a trained model for use by the machine learning based operation 118 as shown in FIG. 2. In some embodiments, training may occur by inputting the labeled training data 105 into the machine-learning operation model generator 210. The machine-learning operation model generator 210 then may generate and provide an operation model 211 to the machine leaning based operation 118 that has been trained on the labeled training data 105, as shown in FIG. 2.

The file attribute reader 304, when executed, may read the one or more files 109 provided by the file interface 302 and parse attributes of the one or more files 109. In some embodiments, the file attribute reader 304 may provide the attributes to the scan deferral engine 116. Within the scan deferral engine 116, the confidence value generator 208, when executed, may generate confidence values based on the user preferences 216, the file attributes 212, and the deferral learning model 117. The confidence value generator 208 may provide the confidence values 209 to the operation determinator 204 as shown in FIG. 2.

The operation determinator 204, when executed, may choose the scan operation that is to scan the one or more files 109 for malware. In some embodiments, the operation determinator 204 may determine the scan operation based on the confidence values provided by the confidence value generator 208. For example, if the confidence value for the machine learning-based operation 118 is higher than the confidence value for the 3<sup>rd</sup> party operation 120, then the operation determinator 204 may select the machine learning-based operation 118 to scan the one or more files 109 for malware.

The 3<sup>rd</sup> party operation 120, when selected by the operation determinator 204, may scan the one or more files 109 for malware and output the malware detection results as shown in FIG. 2. The 3<sup>rd</sup> party operation 120 may represent antivirus scanners from outside sources. For example, the 3<sup>rd</sup> party operation 120 may be a Bitdefender antivirus scanner, as an example. The machine learning-based operation 118, when selected by the operation determinator 204, may scan the one or more files 109 based on the operation model 211 and output the malware detection result 214.

FIG. 4 is a block diagram illustrating example components of a file that may be scanned by a malware scanner module, according to some embodiments.

In some embodiments, such as shown in FIGS. 1, 2 and 3, the one or more files 109 may include further features, such as shown in FIG. 4. In some embodiments, one of the one or more files 109 that may be scanned for malware, may resemble a file 109 as shown in FIG. 4. The file 109 may include portions such as a header 402, sections 404, and program header 406. Each portion may include attributes as shown by numbers 1 through 9 in FIG. 4. In some embodiments, the attributes listed in FIG. 1 may include attributes listed in FIG. 4. Although the attributes are represented by numbers, the number of attributes is not limited to only 9. Each portion of the file 109 is also not limited to a certain number of attributes. The header 402 may provide information about the file such as the purpose of the file, the version, and the class. The sections 404 may define all the sections in a file. The program header 406 may provide instructions for how to form a process or memory image.

The attributes for the file 109 may include but are not limited to, a class field, a version value, a machine type, a file type, a data size, or a data type. In some embodiments, the attributes in the file 109 may be utilized to determine whether the file is similar to one or more files with similar file attributes from the labeled training data 105. The predicted malware detection result for each scan operation of file 109 may be compared with the label on the determined one or more files with similar file attributes from the labeled training data 105 to generate values indicating the confidence that the scan operation may produce a malware detection result that matches the label on the determined one or more files with similar file attributes.

In some embodiments, the attributes provided to the scan deferral engine 116 may be used as detailed information about the file 109 to recognize files with similar attributes from the labeled training data 105. Such attributes may be parsed by the file attribute reader 304 and provided to the confidence value generator 208.

Figure 5:
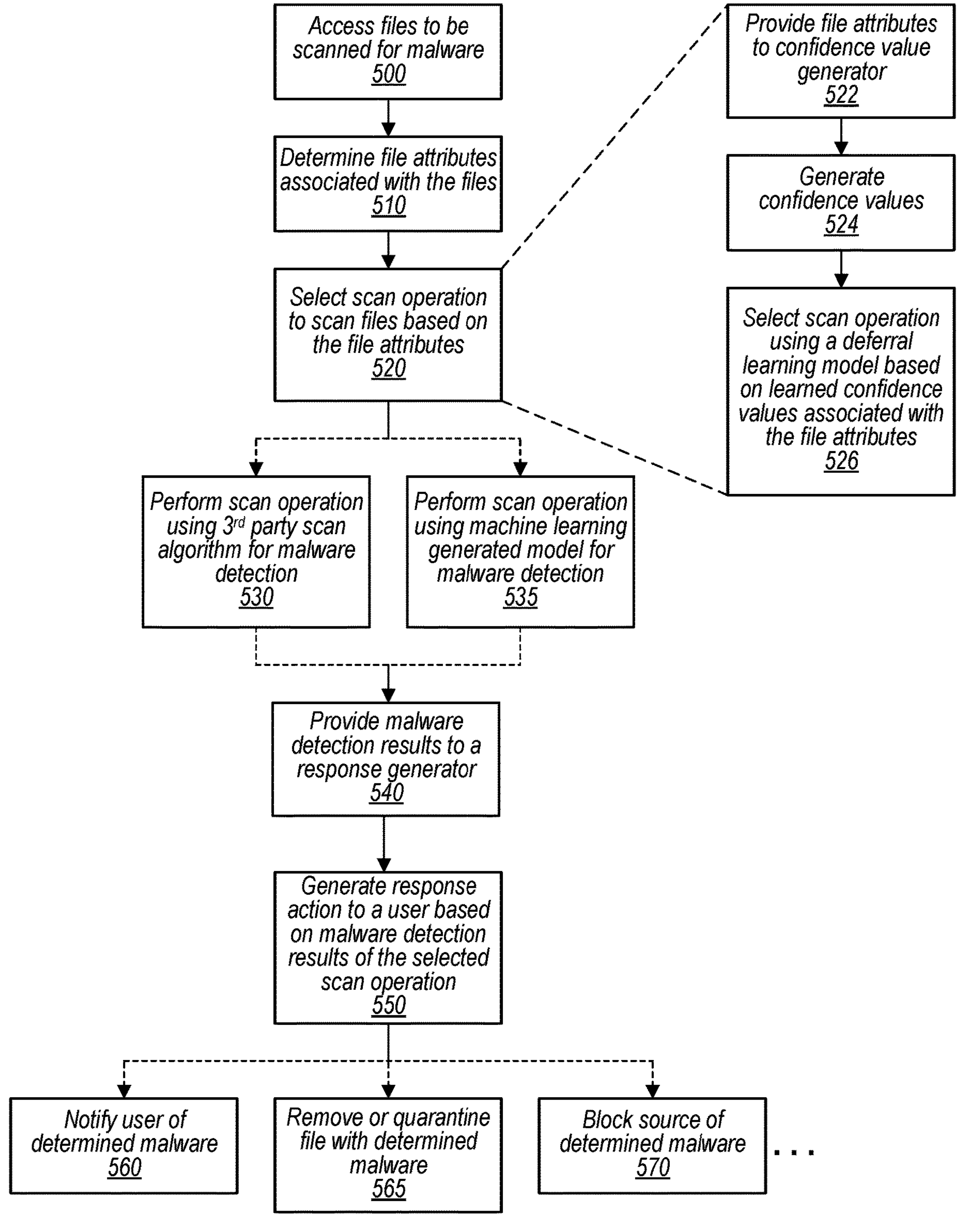
FIG. 5 is a flow diagram illustrating a process for performing malware scanning that determines malware detection results and generates a response based on the malware detection results, wherein after malware scanning is performed, a response engine outputs an event indication to send to recipients, according to some embodiments.

FIG. 5 is a flow diagram illustrating a process for performing malware scanning that determines malware detection results and generates a response based on the malware detection results, wherein after malware scanning is performed, a response engine outputs an event indication to send to recipients, according to some embodiments.

In some embodiments, a process of performing malware scanning to determine malware detection results may resemble a process such as that which is shown in FIG. 5. In block 500, files may be accessed for the purpose of scanning for malware. For example, files may be provided to a malware scanner. In block 510, file attributes associated with the files may be determined. For example, the attributes shown in FIG. 4 may represent the file attributes. In block 510, a scan operation to scan files based on the file attributes may be selected. For example, a scan deferral engine may choose a scan operation between a machine learning based operation and a $3^{rd}$ party operation as shown in FIG. 2.

In blocks 522-526, the process of selecting the scan operation may be further described. In block 522, file attributes may be provided to a confidence value generator. In block 524, confidence values may be generated. For example, a confidence value generator may produce confidence values based on user preferences, a deferral learning model, and the file attributes. In block 526, the scan operation may be selected by using a deferral learning model based on learned confidence values associated with the file attributes. In the same example, the confidence value generator may provide the confidence values for an operation determinator to select the scan operation.

Once the scan operation is selected, the flow diagram may continue to block 530 or block 535. In block 530, a scan operation using a $3^{rd}$ party scan algorithm for malware detection may be performed to scan the accessed files for malware. In block 535, a scan operation using a machine learning generated model for malware detection may be performed to scan the accessed file for malware. Both block 530 and 535 (which are alternatively selected based on the results of the scan selection at block 520) result in block 540. In block 540, malware detection results may be provided to a response generator. Possible results may include, "BENIGN" representing no malware detected or "MALICIOUS" representing at least one malware event detected. In some embodiments, confidence values may further be provided with the result. For example, a malicious result may be accompanied with a confidence value, such as a 95% confidence that the file includes malware.

In block 550, a response action to a user based on the malware detection result of the selected scan operation may be generated. Blocks 560, 565, or 570 represent possible response actions. Any combination of the response actions may be performed. Response actions outside of the ones listed herein may also be performed in addition to or independently from the listed response actions. The possible response actions may also occur independently from each other, in succession to each other, or at the same time. In block 560, a user may be notified of the determined malware. For example, a pop-up notification may be sent to a screen of the user indicating the malware and the file containing the malware. In block 565, the file of the determined malware may be removed or quarantined. In block 570, the source of the malware may be blocked. For example, if the malware came from a software a user accidentally selected, the software may be blocked from the user's device or account to prevent damage to the user's device or account by future malware from the same source.

Figure 6:
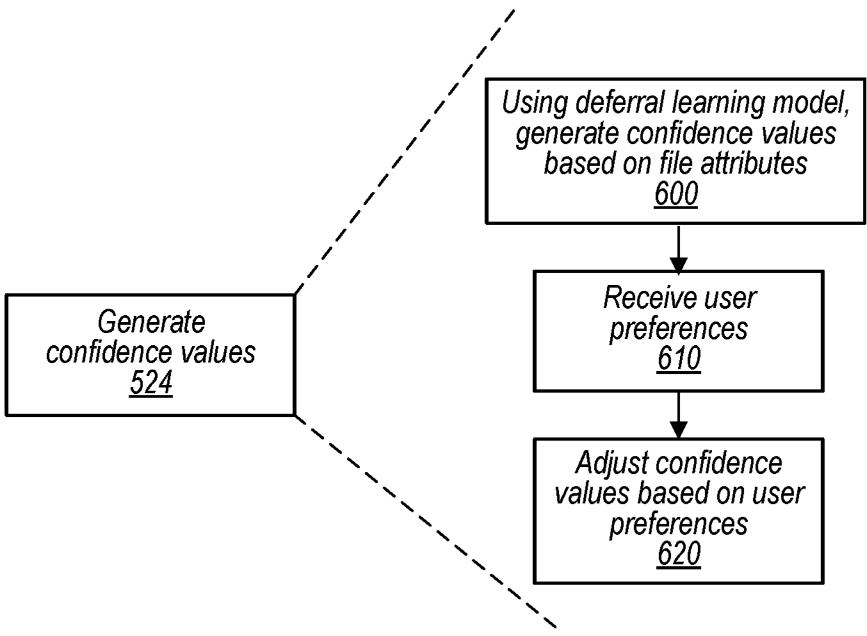
FIG. 6 is a flow diagram illustrating a process for generating confidence values used to select a scan operation, according to some embodiments.

FIG. 6 is a flow diagram illustrating a process for generating confidence values used to select a scan operation, according to some embodiments.

In some embodiments, a process for generating confidence values may resemble a process such as that which is shown in FIG. 6. In block 600, using the deferral learning model, confidence values may be determined based on the determined file attributes. The deferral learning model may train the confidence generator to recognize files with similar attributes from the labeled training data and generate values indicating confidence that the scan operations will output a malware detection result that matches the labels of the files with the similar attributes in the training data.

In block 610, user preference may be received. In some embodiments, user preferences may indicate if the user prefers a scan operation or prefers false positives or false negatives. In block 620, the confidence values may be adjusted based on the user preferences. For example, if the user prefers a specific scan operation, then the confidence value for that specific scan operation may increase, or said another way, a weighting factor may be applied to skew selection in line with the user's preferences. In another example, if the user prefers false positives over false negatives, then the confidence values may be adjusted (or weighted) so that the selection may be biased towards a malware detection result indicating malware.

Figure 7:
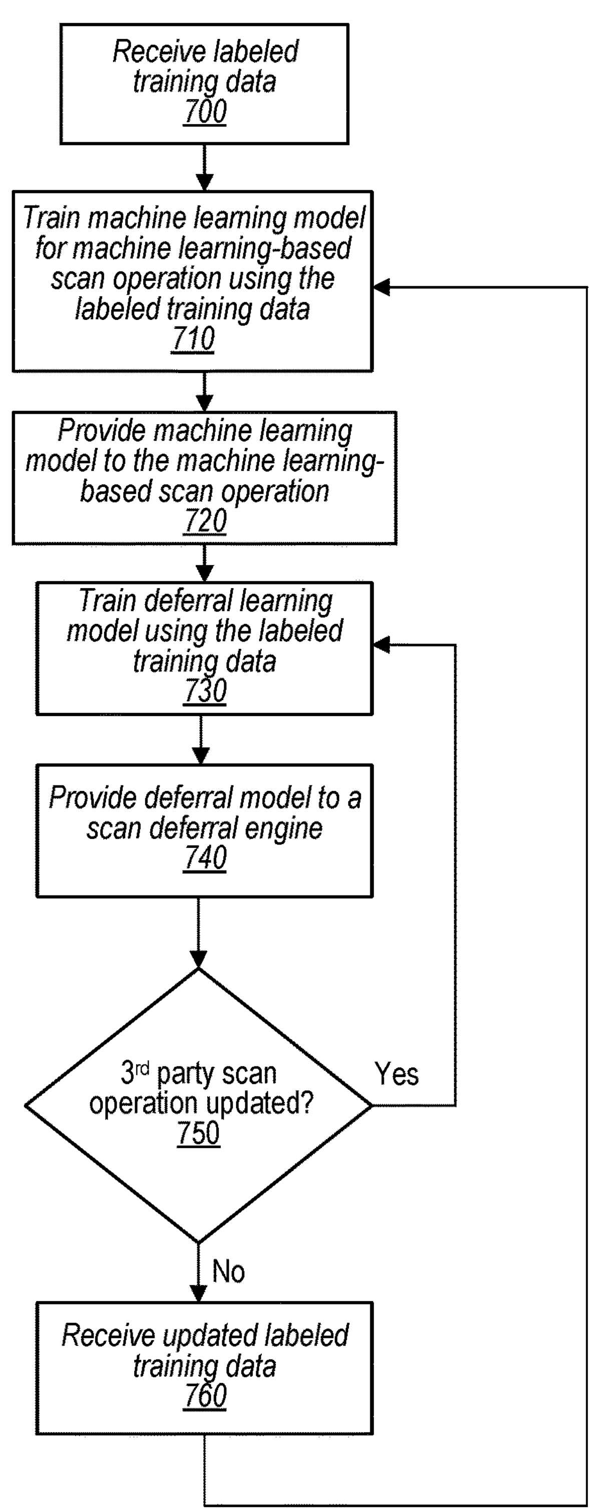
FIG. 7 is a flow diagram illustrating a process of training a machine learning model for a machine learning-based scan operation and a deferral learning model for a scan deferral engine, according to some embodiments.

FIG. 7 is a flow diagram illustrating a process of training a machine learning model for a machine learning-based scan operation and a deferral learning model for a scan deferral engine, according to some embodiments.

In some embodiments, a process for training a machine learning model for a machine learning based scan operation and a deferral learning model for a scan deferral engine may resemble a process such as that which is shown in FIG. 7. In block 700, labeled training data may be received. In some embodiments, the labeled training data may include files that are labeled to indicate whether each file contains malware. In block 710, the machine learning model may be trained for the machine learning-based scan operation using the labeled training data. In block 720, the machine learning model may be provided to the machine learning-based scan operation.

In block 730, the deferral learning model may be trained using the labeled training data. In block 740, the deferral model may be provided to a scan deferral engine. The deferral learning model may be trained after the machine learning model so that the deferral learning model trains based on the most updated machine learning-based scan operation. In block 750, the deferral learning model may check if the $3^{rd}$ party scan operation has been updated. If the $3^{rd}$ party scan operation has not been updated, the process may continue to block 760. If the $3^{rd}$ party scan operation has been updated, blocks 730-760 may be repeated. In block 760, updated labeled training data may be received. After block 760, the process may repeat again at block 700.

Figure 8:
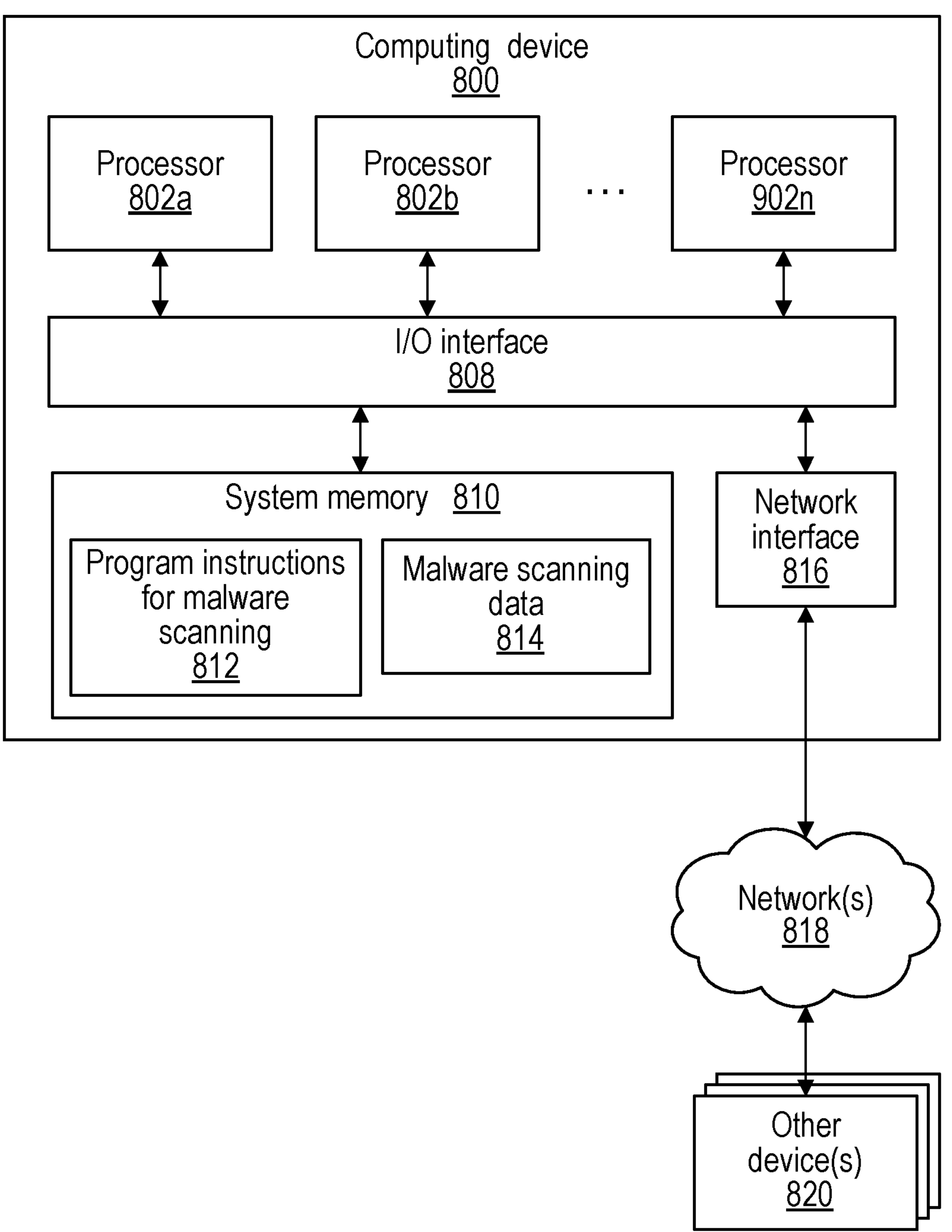
FIG. 8 is a block diagram illustrating an example computer system that implements portions of the malware scanning described herein, according to some embodiments.

FIG. 8 is a block diagram illustrating an example computer system that implements portions of the malware scanning described herein, according to some embodiments.

In at least some embodiments, a server that implements a portion or all of one or more of the technologies described herein, including the techniques for detection of malicious events, may include a general-purpose computer system that includes or is configured to access one or more computer-accessible media. FIG. 8 illustrates such a general-purpose computing device 800. In the illustrated embodiment, computing device 800 includes one or more processors 802 coupled to a system memory 810 (which may comprise both non-volatile and volatile memory modules) via an input/ output (I/O) interface 808. Computing device 800 further includes a network interface 816 coupled to I/O interface 808.

In various embodiments, computing device 800 may be a uniprocessor system including one processor 802, or a multiprocessor system including several processors 802 (e.g., two, four, eight, or another suitable number). Processors 802 may be any suitable processors capable of executing instructions. For example, in various embodiments, processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA. In some implementations, graphics processing units (GPUs) may be used instead of, or in addition to, conventional processors.

System memory 810 may be configured to store instructions and data accessible by processor(s) 802. In at least some embodiments, the system memory 810 may comprise both volatile and non-volatile portions; in other embodiments, only volatile memory may be used. In various embodiments, the volatile portion of system memory 810 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery).

In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 810 as program instructions for malware scanning 812 and malware scanning data 814.

In one embodiment, I/O interface 808 may be configured to coordinate I/O traffic between processor 802, system memory 810, and any peripheral devices in the device, including network interface 816 or other peripheral interfaces such as various types of persistent and/or volatile storage devices. In some embodiments, I/O interface 808 may perform any necessary protocol, timing or other data transformations to convert data signals from one component (e.g., system memory 810) into a format suitable for use by another component (e.g., processor 802).

In some embodiments, I/O interface 808 may include support for devices attached through various types of peripheral buses, such as a variant of the Peripheral Component Interconnect (PCI) bus standard or the Universal Serial Bus (USB) standard, for example. In some embodiments, the function of I/O interface 808 may be split into two or more separate components, such as a north bridge and a south bridge, for example. Also, in some embodiments some or all of the functionality of I/O interface 808, such as an interface to system memory 810, may be incorporated directly into processor 802.

Network interface 816 may be configured to allow data to be exchanged between computing device 800 and other devices 820 attached to a network or networks 818, such as other computer systems or devices as illustrated in FIG. 1 through FIG. 7, for example. Additionally, network interface 816 may support communication via telecommunications/telephony networks such as analog voice networks or digital fiber communications networks, via storage area networks such as Fibre Channel SANs, or via any other suitable type of network and/or protocol.

In some embodiments, system memory 810 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 800 via I/O interface 808. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 800 as system memory 810 or another type of memory.

In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 816.

Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:

one or more hardware computing devices configured to implement a scanner, wherein the one or more hardware computing devices are configured to:

access one or more files to be scanned for malware;

determine one or more file attributes associated with the one or more files; and select a scan operation to use to scan the one or more files for malware, based on the determined one or more file attributes, from among a plurality of scan operations comprising:

a) a first scan operation using a third-party scan algorithm for detecting malware; and b) a second scan operation using a machine learning generated model for detecting malware, wherein to perform the selection based on the determined one or more file attributes, the one or more hardware computing devices are configured to:

use a deferral learning model to select the scan operation to use, wherein the deferral learning model has been trained to select the scan operation based on learned confidence values associated with the one or more file attributes, wherein the learned confidence values are based on accuracy of malware detection in previous results of the first scan operation for other files having the one or more file attributes or previous results of the second scan operation for the other files having the one or more file attributes.

2. The system of claim 1, wherein the one or more hardware computing devices are configured to:

receive training data that has been labeled to indicate malware comprised in the training data;

train a machine learning model for the second scan operation using the training data; and train the deferral learning model using the training data.

3. The system of claim 2, wherein the one or more hardware computing devices are configured to:

generate the learned confidence values based on whether predicted malware detection results of the first or second scan operation match malware detection results indicated in labels in the training data.

4. The system of claim 1, wherein the one or more hardware computing devices are configured to:

receive user selection preferences towards false positives or false negatives; and generate the learned confidence values based, at least in part, on the user selection preferences.

5. The system of claim 1, wherein the selection of the scan operation is by default biased towards the first scan operation.

6. The system of claim 1, wherein the one or more hardware computing devices are configured to:

provide a file with learned confidence values lower than a threshold to a service, wherein the service analyzes the file based on human action.

7. One or more non-transitory computer-readable storage media storing program instructions that, when executed on or across one or more processors, implement a scanner and cause the scanner to:

determine one or more file attributes associated with one or more files; and select a scan operation to use to scan the one or more files, based on the determined one or more file attributes, from among a plurality of scan operations comprising:

a) a first scan operation using a third-party scan algorithm for detecting malware; and b) a second scan operation using a machine learning generated model for detecting malware, wherein to perform the selection based on the determined one or more file attributes, the program instructions, when executed on or across the one or more processors, further cause the one or more processors to:

use a deferral learning model to select the scan operation to use, wherein the deferral learning model has been trained to select the scan operation based on learned confidence values associated with the one or more file attributes, wherein the learned confidence values are based on accuracy of malware detection in previous results of the first scan operation for other files having the one or more file attributes or previous results of the second scan operation for the other files having the one or more file attributes.

8. The one or more non-transitory computer readable storage media of claim 7, wherein the instructions, when executed on or across the one or more processors, further cause the one or more processors to:

receive training data that has been labeled to indicate malware comprised in the training data;

train a machine learning model for the second scan operation using the training data; and train the deferral learning model using the training data.

9. The one or more non-transitory computer readable storage media of claim 8, wherein the instructions, when executed on or across the one or more processors, further cause the one or more processors to:

generate the learned confidence values based on whether predicted malware detection results of the first or second scan operation match malware detection results indicated in labels in the training data.

10. The one or more non-transitory computer readable storage media of claim 7, wherein the instructions, when executed on or across the one or more processors, further cause the one or more processors to:

receive user selection preferences towards false positives or false negatives; and generate the learned confidence values based, at least in part, on the user selection preferences.

11. The one or more non-transitory computer readable storage media of claim 7, wherein the instructions, when executed on or across the one or more processors, further cause the one or more processors to:

generate a response action to a user based, at least in part on a malware detection result of the selected first or second scan operation.

12. The one or more non-transitory computer readable storage media of claim 11, wherein the response action comprises a malware detection notification.

13. The one or more non-transitory computer readable storage media of claim 11, wherein the response action causes the file with the malware to be removed.

14. The one or more non-transitory computer readable storage media of claim 11, wherein the response action causes a source of the malware to be blocked.

15. A method, comprising:

determining one or more file attributes associated with one or more files; and selecting a scan operation to use to scan the one or more files, based on the determined one or more attributes, from among a plurality of scan operations comprising:

a) a first scan operation using a third-party scan algorithm for detecting malware; and b) a second scan operation using a machine learning generated model for detecting malware, wherein performing the selection based on the determined one or more file attributes comprises:

using a deferral learning model to select the scan operation to use, wherein the deferral learning model has been trained to select the scan operation based on learned confidence values associated with the one or more file attributes, wherein the learned confidence values are based on accuracy of malware detection in previous results of the first scan operation for other files having the one or more file attributes or previous results of the second scan operation for the other files having the one or more file attributes.

16. The method of claim 15, further comprising:

receiving training data that has been labeled to indicate malware comprised in the training data;

training a machine learning model for the second scan operation using the training data; and training the deferral learning model using the training data.

17. The method of claim 16, further comprising:

generating the learned confidence values based on whether predicted malware detection results of the first or second scan operation match malware detection results indicated in labels in the training data.

18. The method of claim 15, further comprising:

receiving user selection preferences towards false positives or false negatives; and generating the learned confidence values based, at least in part, on the user selection preferences.

19. The method of claim 15, wherein the one or more files comprise one or more Linux-based files.

20. The method of claim 15, wherein the first and second scan operations are configured to detect malware including viruses, ransomware, cryptominers, worms, viruses, trojans, bot[net]s, adware, spyware, or rootkits.

* * * * *